United States Patent
Schmitt et al.

(10) Patent No.: US 12,226,902 B2
(45) Date of Patent: Feb. 18, 2025

(54) METHOD AND MANIPULATION SYSTEM FOR MANIPULATION OF AN OBJECT BY A ROBOT

(71) Applicant: Siemens Aktiengesellschaft, Munich (DE)

(72) Inventors: Philipp Sebastian Schmitt, Munich (DE); Florian Wirnshofer, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 375 days.

(21) Appl. No.: 17/626,926

(22) PCT Filed: Jul. 10, 2020

(86) PCT No.: PCT/EP2020/069583
§ 371 (c)(1),
(2) Date: Jan. 13, 2022

(87) PCT Pub. No.: WO2021/018552
PCT Pub. Date: Feb. 4, 2021

(65) Prior Publication Data
US 2022/0258335 A1    Aug. 18, 2022

(30) Foreign Application Priority Data

Jul. 30, 2019    (EP) .................................... 19188992

(51) Int. Cl.
*B25J 9/16*    (2006.01)
(52) U.S. Cl.
CPC ............... *B25J 9/163* (2013.01); *B25J 9/161* (2013.01); *B25J 9/1651* (2013.01); *B25J 9/1666* (2013.01); *B25J 9/1671* (2013.01)

(58) Field of Classification Search
CPC . B25J 9/161; B25J 9/162; B25J 9/1651; B25J 9/1666; B25J 9/1671; B25J 9/1676; G05B 2219/39087
See application file for complete search history.

(56) References Cited

U.S. PATENT DOCUMENTS 5,704,011 A    12/1997    Hansen
9,811,074 B1 *    11/2017    Aichele .................. B25J 9/1656
(Continued)

FOREIGN PATENT DOCUMENTS

| CN | 105549598 A | 5/2016 |
| CN | 107097205 A | 9/2016 |

(Continued)

OTHER PUBLICATIONS

Mohamed, Amr et al.; "Optimal collision free path planning for an autonomous articulated vehicle with two trailers", 2017 IEEE International Conference on Industrial Technology (ICIT), IEEE, XP033091175, pp. 860-865, Mar. 22, 2017 (Mar. 22, 2017), DOI: 10.1109/ICIT.2017.7915472.

(Continued)

*Primary Examiner* — Jason Holloway
*Assistant Examiner* — Blake A Wood
(74) *Attorney, Agent, or Firm* — Schmeiser, Olsen & Watts LLP

(57) ABSTRACT

Provided is a method wherein a movement or a manipulation of an object by a robot, observing constraints, from a starting condition to the manipulation target, is generated, wherein the manipulation is divided into different manipulation modes or sections, which include different constraints, wherein a plurality of manipulation mode-specific controllers for controlling partial manipulations in the different manipulation modes for sections are randomly generated and an optimized sequence of the controllers is randomly (Continued)

generated, wherein the controllers specify a vector field or a directional field, wherein a simulation module simulates the manipulation or movement for each of the controller sequences and determines an expense value or a cost value quantifying a reaching of the manipulation target, and wherein the controller sequence and the expense value are supplied to a machine learning module as training data in order to indicate an expense-optimized controller, which optimizes or minimizes the expense value.

17 Claims, 4 Drawing Sheets

(56) References Cited

U.S. PATENT DOCUMENTS

| | | | |
|---|---|---|---|
| 2012/0191244 A1* | 7/2012 | Kim | B25J 9/16 700/245 |
| 2014/0109830 A1 | 4/2014 | Herre | |
| 2015/0336268 A1* | 11/2015 | Payton | G05B 19/423 901/3 |
| 2016/0288323 A1* | 10/2016 | Mühlig | B25J 9/163 |
| 2017/0252922 A1 | 9/2017 | Levine | |
| 2018/0029228 A1 | 2/2018 | Haddadin | |
| 2018/0290298 A1* | 10/2018 | Grotmol | B25J 9/163 |
| 2019/0084151 A1* | 3/2019 | Bai | B25J 9/1612 |
| 2019/0202053 A1* | 7/2019 | Tan | B25J 9/1664 |
| 2019/0224854 A1 | 7/2019 | Hanetseder | |
| 2020/0279134 A1* | 9/2020 | Bousmalis | G06F 18/2431 |

FOREIGN PATENT DOCUMENTS

| | | |
|---|---|---|
| CN | 106041934 A | 10/2016 |
| CN | 107150347 A | 9/2017 |
| CN | 107972036 A | 5/2018 |
| CN | 109540151 A | 3/2019 |
| CN | 109711527 A | 5/2019 |
| CN | 109789557 A | 5/2019 |
| CN | 109901389 A | 6/2019 |
| JP | 2006302282 A | 11/2006 |
| JP | 2019508273 A | 3/2019 |
| WO | 2016134931 A1 | 9/2016 |
| WO | 2018168537 A1 | 9/2018 |

OTHER PUBLICATIONS

Kei, Ota et a.; "Trajectory Optimization for Unknown Constrained Systems using Reinforcement Learning", arxiv.org, Cornell University Library, 201 OLIN Library Cornell University Ithaca, NY 14853, XP081129142, Mar. 14, 2019.

Aertbelien, Erwin et al.; "eTaSL/eTC: A constraint-based task specification language and robot controller using expression graphs", 2014 IEEE/RSJ International Conference on Intelligent Robots and Systems, IEEE, XP032676801, pp. 1540-1546, Sep. 14, 2014 (Sep. 14, 2014), DOI: 10.1109/IROS.2014.6942760.

Schmitt, Philipp S. et al.; "Modeling and Planning Manipulation in Dynamic Environments", 2019 International Conference on Robotics and Automation (ICRA), IEEE, XP033593775, pp. 176-182, May 20, 2019 (May 20, 2019), DOI: 10.1109/ICRA.2019.8793824.

"Modeling and Planning Manipulation in Dynamic Environments" von Philipp S. Schmitt et al., in Int. Conf. on Robotics and Automation, IEEE, 2019, Vorabdruck online unter http://ais.informatik.uni-freiburg.de/publications/papers/schmitt19icra.pdf.

PCT International Search Report mailed Oct. 16, 2020 corresponding to PCT International Application No. PCT/EP2020/069583.

You Bo et al.; "The Manned Hexapod Robot's Machine Function Allocation and the Design of the Control System"; Journal of Harbin University of Science and Technology; pp. 48-53; vol. 22; No. 1; Feb. 15, 2017.

* cited by examiner

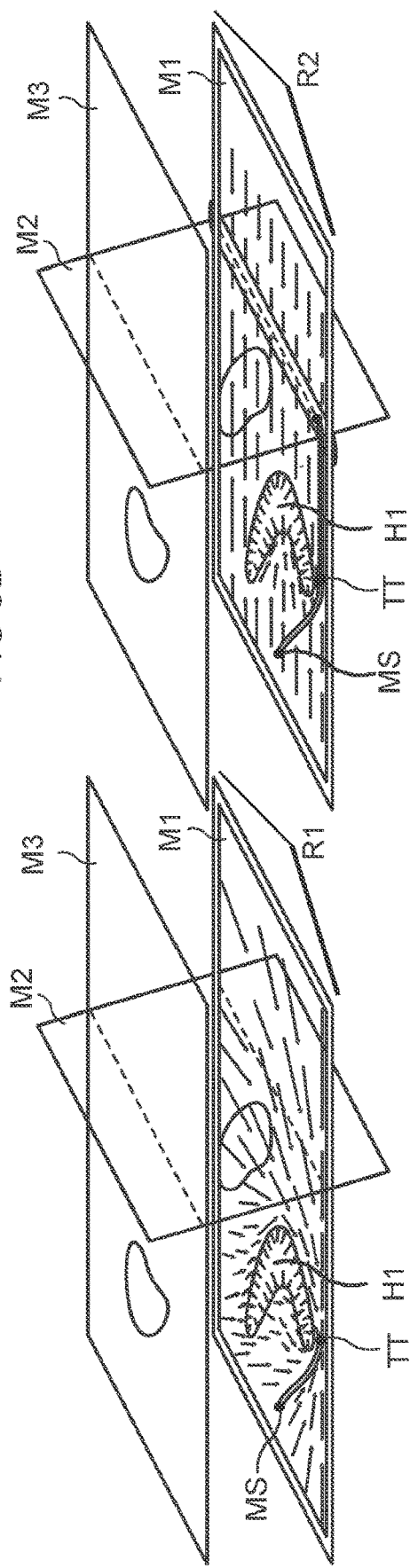
FIG 3A
FIG 3B
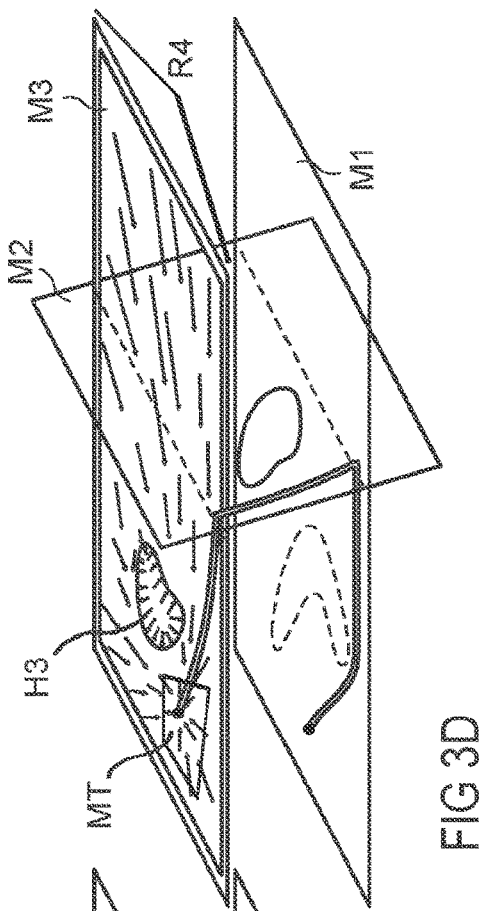
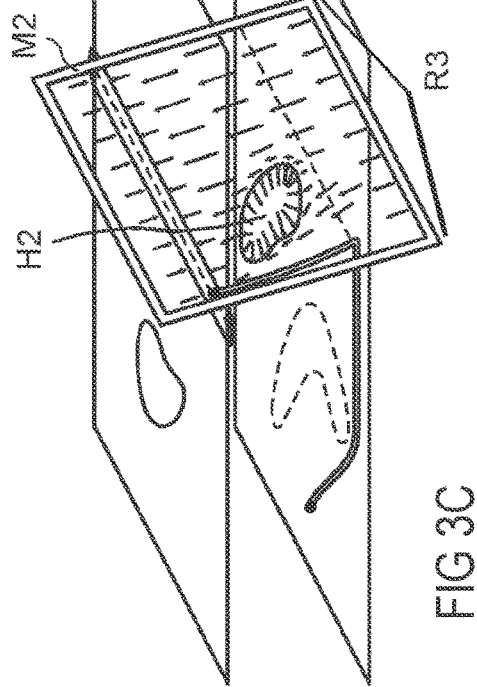
FIG 3C
FIG 3D

METHOD AND MANIPULATION SYSTEM FOR MANIPULATION OF AN OBJECT BY A ROBOT

CROSS-REFERENCE TO RELATED APPLICATIONS

This application claims priority to PCT Application No. PCT/EP2020/069583, having a filing date of Jul. 10, 2020, which claims priority to EP Application No. 19188992.2, having a filing date of Jul. 30, 2019, the entire contents both of which are hereby incorporated by reference.

FIELD OF TECHNOLOGY

The following relates to a method and manipulation system for manipulation of an object by a robot.

BACKGROUND

In many fields, in particular in the production of products, in logistics and for many services, use is increasingly being made of robots, in particular industrial robots, service robots, transport robots, gantry robots or other automated manipulation systems for manipulation of objects. In this case, typical manipulation tasks comprise in particular gripping, processing and/or handling of objects. By way of example, a robot may firstly move a camera over an object to be manipulated, localize the object with the aid of the camera, move a gripper into the vicinity of the object, grasp the object, move the gripped object into a placement position and release the object again.

In the case of such manipulations, it is often necessary to comply with a multiplicity of constraints, which may relate in particular to movement restrictions of the robot, a fixing of objects, force limitations, distance limitations or an avoidance of collisions with other robots or obstacles.

Hitherto, planning of such manipulations has been effected manually in many cases. Manual planning is generally time-consuming, however. Moreover, often only a limited number of modes of behavior can be programmed for the robot.

Furthermore, computer-aided planners are available, which allow automated planning of robot manipulations. In the context of such planning, often proceeding from a task description for the manipulation and the constraints to be complied with in this case, one or a plurality of trajectories for the manipulation that satisfy the constraints are determined. The robot can then implement the trajectories determined. In many cases, however, such trajectories are not suitable for a reactive, that is to say controlled, implementation. Thus, in the event of deviations of the actual manipulation from the determined trajectory, the robot often cannot react in a controlled manner.

The document "Modeling and Planning Manipulation in Dynamic Environments" by Philipp S. Schmitt et al., in Int. Conf. on Robotics and Automation, IEEE, 2019, preprint online at http://ais.informatik.uni-freiburg.de/publications/papers/schmitt19icra.pdf (retrieved on Jul. 10, 2019), discloses a method that makes it possible to generate so-called constraint-based controllers for the controlled implementation of manipulations under predefined constraints. However, many of the controllers generated in this way may as it were founder on unfavorably shaped obstacles. Reference is made to the above document hereinafter with [1].

SUMMARY

An aspect relates to a method and a manipulation system for manipulation of an object by a robot which allow obstacles to be bypassed in a controlled and flexible manner.

For manipulation of an object by a robot, wherein the manipulation is directed at a manipulation target and comprises different manipulation modes, a plurality of manipulation mode-specific controllers each for controlling a partial manipulation restricted to a manipulation mode are generated. In this case, the robot may in particular be an industrial robot, a service robot, a transport robot, a gantry robot, a so-called gantry or some other manipulation system for manipulation of objects. According to the invention, for a multiplicity of manipulation states and a multiplicity of the generated controllers, in each case a partial manipulation which proceeds from the respective manipulation state and is controlled by the respective generated controller is simulated, wherein an outlay value quantifying attainment of the manipulation target is determined. On the basis of the multiplicity of the manipulation states, the multiplicity of the generated controllers and also the outlay values, a machine learning module is trained to determine, on the basis of a manipulation state, one of the generated controllers which optimizes an outlay value. In this case, optimizing should also be understood to mean approaching an optimum. Furthermore, a current manipulation state is detected using sensor means, on the basis of which current manipulation state an outlay-optimizing controller is determined by the trained machine learning module. Control data for controlling the robot are generated by the outlay-optimizing controller on the basis of the current manipulation state.

A manipulation system, a computer program product (non-transitory computer readable storage medium having instructions, which when executed by a processor, perform actions) and also a computer-readable, nonvolatile, storage medium are provided for carrying out the method according to the invention.

The method according to the invention, the manipulation system according to the invention and also the computer program product according to the invention can be carried out and implemented for example by one or more processors, one or more computers, application-specific integrated circuits (ASICs), digital signal processors (DSPs) and/or so-called "field programmable gate arrays" (FPGAs).

One advantage of the invention can be seen in particular in the fact that it allows a reactive and robust control of complex manipulations. On account of a multiplicity of manipulation states and control variants being taken into account, a bypassing of complex obstacles can be trained successfully in many cases. Insofar as an application of a trained machine learning module generally requires a considerably lower computational complexity than the training of the module, an outlay-optimizing controller with respect to a current manipulation state can often be determined in real time.

According to one embodiment of the invention, a state space of the manipulation can comprise a configuration of the robot, a robot state, an object state, a contact state between robot and object, a time parameter, a time derivative and/or a state of other components involved in the manipulation. In particular, a configuration space of the robot can be a subspace of the state space.

Furthermore, different constraints to be complied with during the manipulation can be detected. A respective manipulation mode can then be derived from a restriction of the state space that is caused by a respective constraint. In particular, such a restriction of the state space can be specified, defined and/or represented by the relevant manipulation mode. The restrictions of the state space can form in each case a hypersurface in the state space or a subset of the state space that is delimited by a hypersurface. A respective constraint may in particular also be multidimensional, that is to say relate to a plurality of manipulation parameters. Controllers which are generated for constraint-based manipulation modes are often also referred to as constraint-based controllers. Insofar as such constraint-based controllers each control a partial manipulation which is restricted to a manipulation mode and thus at least approximately complies with a respective constraint, these constraints no longer have to be explicitly taken into account in a subsequent manipulation mode-spanning optimization. As a result, an optimization outlay can be considerably reduced in many cases.

A respective constraint can relate in particular to a fixing of the object, a movement limitation of an axis of the robot, a collision avoidance, a speed limitation, an acceleration limitation, a force limitation and/or a distance limitation. In particular, a respective constraint can be governed by kinetics or dynamics of robot movements and/or of gripping processes.

Furthermore, provision can made for a manipulation mode-specific controller for controlling a partial manipulation which is restricted to a first manipulation mode and leads to a second manipulation mode to be generated. Such controllers are often also referred to as mode-switching controllers and enable a changeover between different manipulation modes.

Furthermore, provision can be made for a partial manipulation target to be selected within a manipulation mode, and for a manipulation mode-specific controller for controlling a partial manipulation which is restricted to the manipulation mode and leads to the partial manipulation target to be generated. In an embodiment, the partial manipulation target can be selected in a randomly based manner. Such a controller is often also referred to as a random-target controller. By such random-target controllers, paths for bypassing obstacles in a controlled manner can be found in an effective way in many cases.

According to one embodiment of the invention, the multiplicity of the manipulation states can be generated in a randomly based manner, and/or the multiplicity of the generated controllers can be selected in a randomly based manner. This, too, can effectively contribute to finding paths for bypassing obstacles in a controlled manner.

Furthermore, the outlay value can be determined depending on a simulated time duration and/or a number of simulated control steps until the manipulation target is attained.

According to a further embodiment of the invention, for a multiplicity of sequences of generated controllers, in each case a manipulation controlled by the respective sequence can be simulated, wherein an outlay value quantifying attainment of the manipulation target is determined. The training of the machine learning module can then be effected on the basis of these determined outlay values. For the sequence of controllers, it is possible to check in particular by simulation whether or not it leads to the manipulation target.

BRIEF DESCRIPTION

Some of the embodiments will be described in detail, with reference to the following figures, wherein like designations denote like members, wherein:

FIG. 3A illustrates a constraint-based controller for a first manipulation mode;

FIG. 3B illustrates a constraint-based controller for a second manipulation mode;

FIG. 3C illustrates a constraint-based controller for a third manipulation mode;

FIG. 3D illustrates a constraint-based controller for a fourth manipulation mode;

DETAILED DESCRIPTION

Figure 1A:
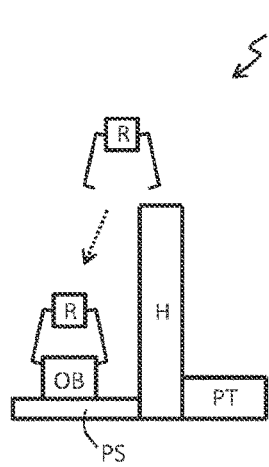
FIG. 1A illustrates a manipulation system when implementing a manipulation on an object, in accordance with embodiments of the present invention.
Figure 1B:
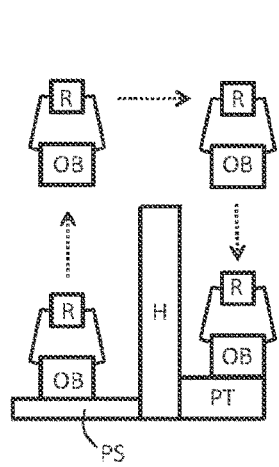
FIG. 1B illustrates the manipulation system when implementing a manipulation on the object, in accordance with embodiments of the present invention.
Figure 1C:
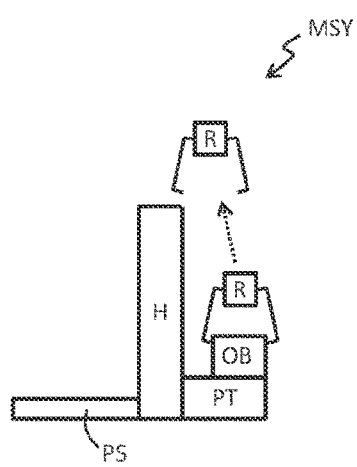
FIG. 1C illustrates the manipulation system when implementing a manipulation on the object, in accordance with embodiments of the present invention.

FIG. 1 shows, in FIGS. 1A, 1B and 1C, in each case a manipulation system MSY comprising a robot R when implementing a manipulation on an object OB in a schematic illustration. In this case, FIGS. 1A, 1B and 1C illustrate different manipulation phases of the manipulation to be implemented. The robot R may be an industrial robot, a service robot, a transport robot, a gantry robot, a so-called gantry, or some other manipulation system for manipulation of objects. A tool, a workpiece or some other article may be manipulated as object OB.

The object OB is situated at a start position PS at the beginning of the manipulation and is intended to be gripped by the robot R and, via an obstacle H, be placed at a target position PT as target of the manipulation.

FIG. 1A illustrates the beginning of the manipulation, during which the robot R or a robot arm or a gripper of the robot R moves to the object OB and grips the object OB situated at the start position PS. In a subsequent manipulation phase illustrated in FIG. 1B, the robot R with the gripped object OB moves over the obstacle H and places the object OB at the target position PT. In a further manipulation phase illustrated in FIG. 1C, the robot R releases the object OB situated at the target position and moves away from the object OB.

As is illustrated in FIGS. 1A, 1B and 1C, in different manipulation phases different constraints have to be complied with by the robot R. In this regard, the robot R with the gripped object OB must maintain a greater distance from the obstacle H than the robot without the gripped object OB. In other words: a collision-free region in a state space of the manipulation changes depending on whether or not the robot R has gripped the object OB.

Figure 2:
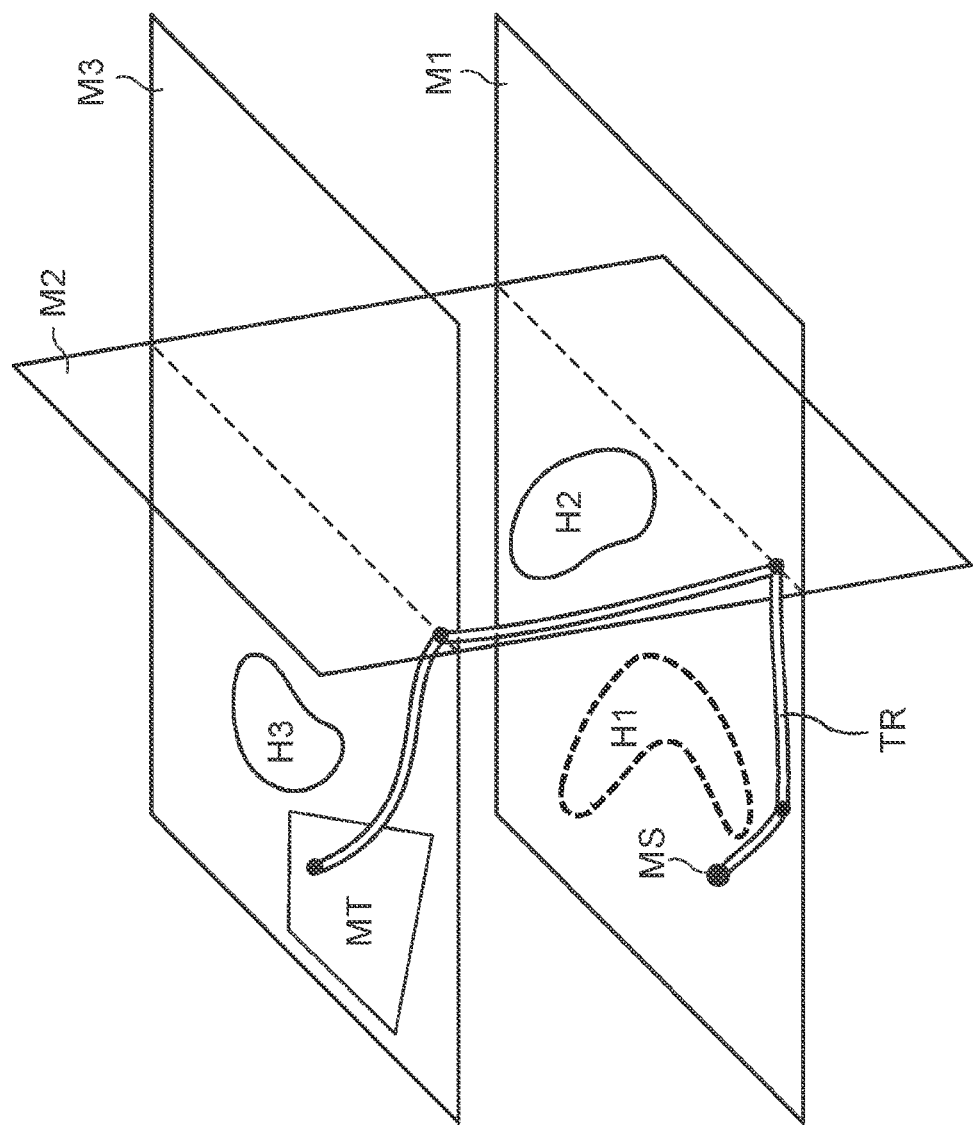
FIG. 2 illustrates regions restricted by constraints in a state space with respect to different manipulation modes.

Such regions restricted by constraints in a state space of the manipulation to be implemented are illustrated in FIG. 2. The regions restricted by different constraints in the state space define different manipulation modes M1, M2 and M3. In this case, the state space is a state space of the components involved in the manipulation. These components may include in particular the robot R, a robot arm or a gripper of the robot R, one or a plurality of objects OB to be manipulated or other components of the manipulation system MSY.

The state space comprises a multiplicity of manipulation states, in particular configurations and also states of the robot R, object states, contact states between robot R and object OB, time parameters, time derivatives and also other states of the manipulation system MSY. On the one hand, the manipulation states of the state space can comprise discrete states specifying e.g., whether or not an object has been gripped, or whether a valve has been opened or closed. On the other hand, the manipulation states of the state space can comprise continuous states such as, for example, positionings, orientations, speeds or forces occurring. Accordingly, the manipulation states of the state space can be represented by movement coordinates, position coordinates, setting variables, measurement data or other manipulation parameters. In particular, it is possible to represent a respective manipulation state with a multiplicity of parameters as a state vector in a high-dimensional state vector space.

Coordinate axes K1, K2 and K3 of the state space are indicated by way of example in FIG. 2. Only three coordinate axes of a possible multiplicity of coordinate axes are illustrated here, for reasons of clarity. In this case, a respective coordinate axis K1, K2 or K3 can also represent a plurality of dimensions of the state space in representative fashion. In the present exemplary embodiment, a position of the robot R and also the gripping state thereof are parameterized along the coordinate axes K1 and K2, while a position of the object OB is parameterized along the coordinate axis K3.

In regard to the state space, the manipulation task to be implemented consists in controlling the components involved in the manipulation while complying with predefined constraints from a start state MS of the manipulation to a manipulation target MT. The manipulation target MT may be one target state to be attained by the manipulation or a range of target states in the state space. A target range is indicated as manipulation target MT in FIG. 2.

Such a manipulation task is often also referred to as a constrained-motion problem. As already evident from the term, an essential aspect of such manipulation tasks is compliance with constraints, which—as already indicated in association with FIG. 1—can change depending on the manipulation phase. The constraints are determined in particular by kinetics and dynamics of the robot movements, of the object movements and of the gripping process. Furthermore, further constraints are defined by the requirement of collision avoidance, e.g., between robot R, object OB and obstacle H and also between other parts of the manipulation system MSY. In this case, the constraints may be time-dependent, in particular, e.g., in the case of movable obstacles. Furthermore, a respective constraint may also be multidimensional, that is to say relate to a plurality of individual manipulation parameters.

A constraint defines in each case a restricted region of the state space in which the respective constraint is at least approximately satisfied. In particular, equality constraints and inequality constraints may be predefined as constraints. One example of an equality constraint is the stable fixing of the object OB. In this case, the object OB must lie stably on a placement surface or be gripped stably by the robot R. A restriction of the state space that is caused by an equality constraint generally forms a hypersurface in the embedding state space. Examples of inequality constraints are movement limitations of axes of the robot R, speed limitations, distance limitations or constraints governed by the requirement of collision avoidance. A restriction of the state space that is caused by an inequality constraint generally forms a subset of the state space that is delimited by a hypersurface.

Insofar as possibly different constraints are to be complied with depending on the manipulation phase, the manipulation to be implemented is decomposed into different manipulation modes, which are defined or specified in each case by the relevant constraint or by the relevant restricted region of the state space. A manipulation mode can represent, define, or specify in particular a contact state between object OB and robot R. Such a contact state can specify for example whether or not an object has been gripped.

For the present exemplary embodiment, only three manipulation modes M1, M2 and M3 are explicitly illustrated in FIG. 2, for reasons of clarity. The manipulation modes M1, M2 and M3 here correspond to hypersurfaces in the state space or subsets delimited by hypersurfaces in the state space. At the beginning of the manipulation, the components involved in the manipulation are in the start state MS associated with the manipulation mode M1, in which state the object OB is positioned at the start position PS and is not moving. In this manipulation mode M1, the robot R and its gripper state can move in the direction of the coordinate axes K1 and K2 independently of the object OB.

In the manipulation mode M2, the object OB is gripped by the robot R, that is to say that the gripper of the robot R is situated at the position of the object OB and the gripper is closed around the object OB. The gripper can move together with the object OB in the direction of the coordinate axes K2 and K3. A transition between a manipulation state with an object OB situated at the start position PS and a manipulation state with an object OB gripped by the robot R can take place only in the intersection of the manipulation modes M1 and M2.

In the manipulation mode M3, the object OB is positioned at the target position PT and the robot R, and its gripper state can move in the direction of the coordinate axes K1 and K2 once again independently of the object OB. A transition between a manipulation state with gripped object OB and a manipulation state with an object OB positioned at the target position PT can take place only in the intersection of the manipulation modes M2 and M3.

In the present exemplary embodiment, the manipulation modes M1, M2 and M3 are restricted by predefined inequality constraints H1, H2 and H3, which are designated as obstacles hereinafter. The obstacles H1, H2 and H3 represent regions of the state space which are impermissible or excluded by the predefined inequality constraints. In this regard, the obstacle H1 forms an impermissible region in the manipulation mode M1, the obstacle H2 forms an impermissible region in the manipulation mode M2, and the obstacle H3 forms an impermissible region in the manipulation mode M3. In this case, the obstacle H2 illustrates an impermissible region with gripped object OB, while the obstacles H1 and H3 represent impermissible regions without a gripped object. The impermissible regions are generally different in different manipulation modes. In this regard—as already mentioned above—the robot R with gripped object OB must maintain a greater distance from the obstacle H than the robot without a gripped object OB.

In the case of a manipulation, a respective current manipulation mode, here M1, M2 or M3, specifies as it were which constraints currently apply, are crucial or are active for the manipulation system MSY.

An exemplary trajectory TR in the state space, which trajectory, proceeding from the start state MS in the manipulation mode M1, leads around the obstacle H1 and changes over to the manipulation mode M2, from there changes over to the manipulation mode M3 and finally leads to the manipulation target MT in the manipulation mode M3, is indicated by a double line in FIG. 2.

FIGS. 3A, 3B, 3C and 3D illustrate different manipulation mode-specific controllers R1, R2, R3 and R4 for different manipulation modes, here M1, M2 and M3. Insofar as the reference signs used in FIGS. 3A to 3D are the same as or correspond to those used in the preceding figures, they designate the same or corresponding entities, which are implemented or realized as described above.

In order to find a path of the components involved in the manipulation from the current manipulation state to the manipulation target MT, two types of movements are implemented: first movements, which remain within a manipulation mode and there steer toward a predefined partial manipulation target, and second movements, which, within a first manipulation mode, steer toward a second manipulation mode different therefrom, i.e. the intersection between first and second manipulation modes, in order to enable a changeover from the first to the second manipulation mode.

The movements are intended to be implemented in a controlled manner in each case, that is to say that, in the event of a deviation from a desired trajectory or in the event of obstacles, a movement that compensates for the deviation or leads away from the obstacle is intended to be instigated.

For this purpose, for a respective manipulation mode, here M1, M2 or M3, specific controllers, here R1 to R4, are generated, with the aid of which control data for controlling a manipulation in the respective manipulation mode can be generated for each manipulation state. In this case, the control data cause the robot R or the manipulation system MSY to move in a controlled manner during the manipulation and in the process to remain in the relevant manipulation mode or, in the event of deviations from the manipulation mode, to steer back to the latter in a controlled manner. If appropriate, it is possible to steer toward a partial manipulation target situated in the respective manipulation mode.

By the manipulation mode-specific controllers R1 to R4, it is possible to implement in each case a closed control loop in the relevant manipulation mode. Insofar as such controllers specifically control movements in manipulation modes defined by constraints, these controllers are often also referred to as constraint-based controllers.

The manipulation mode-specific controllers each comprise a data structure that specifies a vector field or a direction field over the state space, in particular over that part of the state space which is restricted to the relevant manipulation mode. In this case, each manipulation state in the relevant manipulation mode is assigned a vector which, within the manipulation mode, predefines a direction in which the manipulation is to be controlled.

For implementing the first and second movements in a controlled manner, accordingly two types of manipulation mode-specific controllers are generated and used. In this regard, firstly so-called random-target controllers for implementing or for controlling the first movements in order to steer toward a partial manipulation target selected in a randomly based manner within a manipulation mode. By such random-target controllers with randomly selected partial manipulation targets, it is possible to find paths in the state space which lead even around complexly shaped obstacles, here e.g., H1, H2 or H3, in order to arrive at the manipulation target MT. Secondly, so-called mode-switching controllers for controlling the second movements are generated in order to change over to another manipulation mode.

The manipulation mode-specific controllers R1 to R4 of the present exemplary embodiment are illustrated in FIGS. 3A to 3D in each case by a direction field on the respectively associated manipulation mode M1, M2 or M3. The direction fields are indicated here in each case by a large number of arrows. A respective resulting trajectory is illustrated by a double line.

FIG. 3A illustrates the constraint-based controller R1 specific to the manipulation mode M1. The controller controls a partial manipulation of the robot R within the manipulation mode M1 which leads in particular from the start state MS to a randomly based partial manipulation target TT. In this case, the robot R is steered around the obstacle H1. The controller R1 is configured as a random-target controller.

FIG. 3B illustrates the constraint-based controller R2, likewise specific to the manipulation mode M1. The controller R2 controls gripping of the object OB situated at the start position PS by the robot R and thus a movement within the manipulation mode M1 to the manipulation mode M2, in which the object OB is gripped by the robot R. The movement is thus directed toward the intersection of the manipulation mode M1 with the manipulation mode M2. The controller R2 is accordingly configured as a mode-switching controller.

FIG. 3C illustrates the constraint-based controller R3 specific to the manipulation mode M2. The controller controls a partial manipulation within the manipulation mode M2 in the direction of the manipulation mode M3, in which the object OB is situated in the target position PT. The movement is effected in the direction of the intersection between the manipulation mode M2 and the manipulation mode M3. The controller R3 is likewise configured as a mode-switching controller.

FIG. 3D illustrates the constraint-based controller R4 specific to the manipulation mode M3. The controller R4 controls, within the manipulation mode M3, release of the object OB situated at the target position PT and also a movement of the robot R to the manipulation target MT.

Generation of the above-described types of constraint-based controllers with respect to predefined constraints is described in detail in document [1], for example.

With regard to the present exemplary embodiment, it should be noted that the controller R2 would cause a movement proceeding from the start state MS to get stuck at the obstacle H1 (see the profile of the direction field in FIG. 3B), with the result that the manipulation mode M2 and ultimately the manipulation target MT would not be attained. By contrast, proceeding from the partial manipulation target TT, the manipulation mode M2 can indeed be attained by the controller R2. That is to say that the controller sequence R1, R2—unlike the controller R2 by itself—proceeding from the start state MS can control a movement into the manipulation mode M2.

A description is given below of how suitable controllers or controller sequences can be found, the application of which controls a continuous and optimized path from the start state MS to the manipulation target MT.

Figure 4:
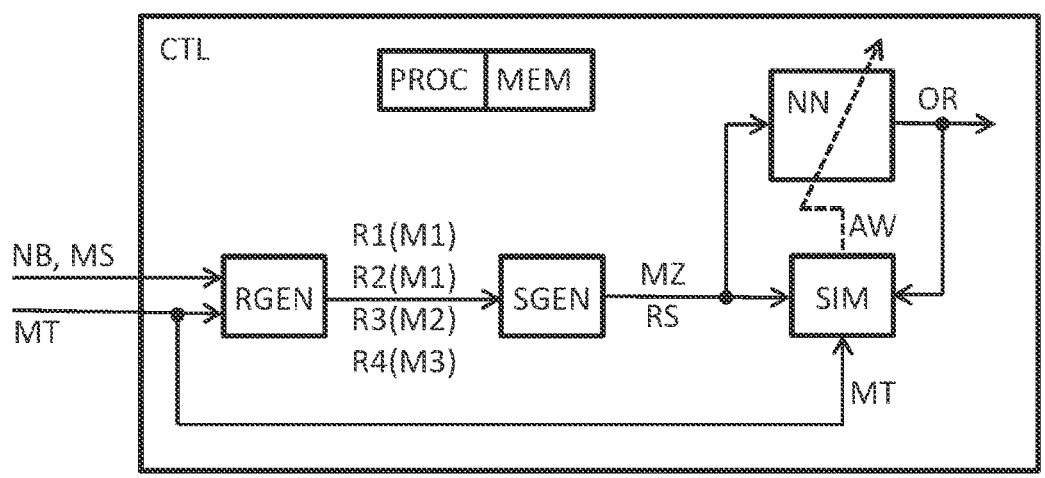
FIG. 4 illustrates a control facility of a manipulation system according to the invention in a training phase.

FIG. 4 illustrates a control facility CTL of a manipulation system according to the invention in a training phase. Insofar as the reference signs used in FIG. 4 are the same as or correspond to those used in the preceding figures, they designate the same or corresponding entities, which are implemented or realized as described above.

The control facility CTL controls in particular the robot R and optionally other parts of the manipulation system MSY. It has a processor PROC for executing learning and control methods proceeding thereon and also a memory MEM for storing data to be processed, the memory being coupled to the processor PROC.

According to the invention, the control facility CTL, on the basis of a task description of the manipulation to be implemented, is intended to generate suitable controllers and to be trained to find an optimized sequence of these controllers which control a continuous movement to the manipulation target MT proceeding from possible start states MS. In this case, the task description specifies in particular constraints NB to be complied with during the manipulation, the manipulation target MT to be steered toward, and also possible start states MS of the manipulation. The constraints NB, the possible start states MS and also the manipulation target MT are communicated to a controller generator RGEN of the control facility CTL.

The constraints NB define different manipulation modes, in the present exemplary embodiment M1, M2 and M3, for the controller generator RGEN. For the different manipulation modes M1, M2 and M3, the controller generator RGEN generates a multiplicity of manipulation mode-specific controllers, here R1, R2, R3 and R4. The generation of such controllers is described thoroughly in document [1], for example. For a real manipulation system, 44 manipulation mode-specific controllers were generated in this way.

As already mentioned above, the controllers R1, ..., R4 control the movement in such a way that the constraints NB are at least approximately complied with. What remains to be determined is what sequence of controllers proceeding from a start state MS or from the current manipulation state actually leads to the manipulation target MT. For this purpose, according to the invention, the intention is to determine a mapping which specifies for a respective manipulation state a controller which, in the associated manipulation mode, controls as effective an approach as possible to the manipulation target MT. In particular, the controller is intended to control at least one segment of a path that actually leads to the manipulation target MT.

Insofar as compliance with the constraints NB, e.g., for collision avoidance or for fixing of the object OB, is already ensured in a reactive manner by the generated controllers R1, ..., R4, these constraints NB no longer have to be taken into account in the manipulation mode-spanning optimization of controller sequences described below. As a result, an optimization outlay can be considerably reduced in many cases.

The abovementioned mapping of manipulation states to constraint-based controllers is produced according to the invention by the training of a machine learning module NN of the control facility CTL. The machine learning module NN comprises an artificial neural network which implements a method of reinforcement learning. In particular, the machine learning module NN can implement a so-called deep Q-network that is trained by a Q-learning method. A large number of reinforcement learning methods are available for training such machine learning modules NN.

Alternatively, or additionally, the machine learning module NN can implement a recurrent neural network, a convolutional neural network, an autoencoder, a deep learning architecture, a support vector machine, a data-driven regression model, a k-nearest neighbor classifier, a physical model and/or a decision tree.

For the purpose of generating training data for the machine learning module NN, the generated controllers R1, ..., R4 are communicated to a sequence generator SGEN of the control facility CTL by the controller generator RGEN, which sequence generator generates from ® controllers for a multiplicity of manipulation states MZ in each case a multiplicity of controller sequences RS. The manipulation states MZ are generated in a manner based randomly on all manipulation modes, here M1, M2 and M3, and are assigned to the respective manipulation mode M1, M2 or M3. The generated manipulation states represent start states in the state space, proceeding from which a path running via a controller sequence RS to the manipulation target MT is intended to be found. The controller sequences RS are likewise generated in a randomly based manner by the sequence generator SGEN. In this way, it is indeed possible for the sequence generator SGEN to generate thousands or millions of different combinations of manipulation states MZ and controller sequences RS.

The manipulation states MZ and the associated controller sequences RS are transmitted to a simulation module SIM by the sequence generator SGEN. The manipulation target MT is also communicated to ® simulation module. The simulation module SIM serves for simulating a manipulation or partial manipulation that proceeds from the respective manipulation state MZ and is controlled by a respective controller or by a respective controller sequence. In this case, the application of the controllers is simulated in particular with regard to the physical manipulation dynamics and manipulation kinetics thereof.

In particular, the simulation module SIM determines whether or not a path that proceeds from the respective manipulation state MZ and is controlled by a respective controller sequence RS leads to the manipulation target MT. In actual fact the majority of the randomly based controller sequences RS will probably be suboptimal and fail in a majority of cases, that is to say will ultimately not lead from the respective manipulation state MZ to the manipulation target MT. In order to quantify attainment of the manipulation target MT, the simulation module SIM determines an outlay value as the simulation result for a respective combination of manipulation state MZ and controller or controller sequence RS. The outlay value can quantify a simulated time duration and/or a number of simulated control steps until the manipulation target MT is attained. For non-attainment of the manipulation target MT, a singular value, e.g., −1, or a very high value, can accordingly be allocated to the outlay value. In particular, in order to determine a respective outlay value, a reward function can be evaluated and/or a discounted sum of individual outlay values can be calculated.

The manipulation states MZ with respectively assigned manipulation mode and also the controller sequences RS are fed to the machine learning module NN as training data. Training should be understood generally to mean an optimization of a mapping of input data, here MZ and RS, of a parameterized system model, here the machine learning module NN, to output data, here a respective indication of an outlay-optimizing controller OR. This mapping is optimized according to predefined criteria, learnt criteria, and/or criteria to be learned, during a training phase. Criteria that are used can be e.g., a success or a performance of a control action in the case of control models or a prediction error in the case of prediction models. In the present exemplary embodiment, what is striven for by the training is to minimize the outlay values determined by simulation. By the training, it is possible to set or optimize e.g., a networking structure of neurons of a neural network and/or weights of connections between the neurons such that the predefined criteria are satisfied as well as possible. The training can thus be regarded as an optimization problem. A large number of efficient optimization methods are available for such optimization problems.

In the present exemplary embodiment, the machine learning module NN is intended to be trained to specify for a predefined manipulation state MZ a controller OR that minimizes an outlay for attaining the manipulation target MT, that is to say the relevant outlay value. For this purpose, the controller OR specified by the machine learning module NN is fed to the simulation module SIM, which outputs in respect thereof an outlay value AW of a controller sequence that proceeds from the associated manipulation state MZ and begins with the specified controller OR. In an embodiment, a controller sequence with a minimum outlay value AW is selected for this. The simulation module SIM feeds the outlay value AW back to the machine learning module NN in order to train the latter—as indicated by a dashed arrow in FIG. 4—to minimize the outlay value AW, that is to say to output for a predefined manipulation state MZ in each case a controller OR that minimizes an outlay value for attaining the manipulation target MT.

After such training has been concluded, the trained machine learning module NN implements a manipulation mode-spanning mapping of a respective manipulation state MZ to a respective outlay-minimizing controller OR, said mapping being optimized by reinforcement learning.

Figure 5:
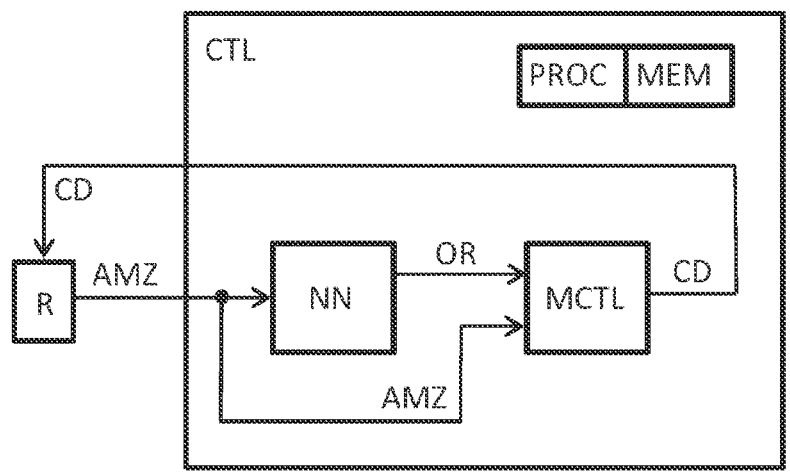
FIG. 5 illustrates the trained control facility when controlling a manipulation.

FIG. 5 shows the trained control facility CTL when controlling a manipulation in a schematic illustration. Insofar as the reference signs used in FIG. 5 are the same as or correspond to those used in the preceding figures, they designate the same or corresponding entities, which are implemented or realized as described above.

In order to control the manipulation, the control facility CTL is coupled to the robot R and/or to other components of the manipulation system MSY. Alternatively, the control facility CTL can also be implemented wholly or partly in the robot R or in the manipulation system MSY.

In order to control the manipulation, a current manipulation state AMZ of the components involved in the manipulation is detected using sensor means and transmitted to the control facility CTL by the robot R. The current manipulation state AMZ and the respectively assigned manipulation mode are communicated to the trained machine learning module NN as input data. The trained machine learning module NN then determines an outlay-optimizing controller OR on the basis of the current manipulation state AMZ and communicates ® outlay-optimizing controller to a manipulation control facility MCTL of the control facility CTL. The current manipulation state AMZ is additionally fed to the manipulation control facility MCTL.

The manipulation control facility MCTL implements the communicated controller OR and, depending on the current manipulation state AMZ, generates control data CD for driving the robot R or other components of the manipulation system MSY in a controlled manner. The driving is effected here in accordance with the respectively implemented controller OR. The generated control data CD are transmitted to the robot R in order to drive the latter in a closed control loop depending on the respective current manipulation state AMZ.

In the present exemplary embodiment, the machine learning module NN can be regarded as a controller which is superordinate to the controllers R1, . . . , R4 and which selects the controller currently to be applied, here OR. A hierarchical controller system is implemented in this way.

The selection of the respective outlay-minimizing controller OR can generally be effected in real time, since the outlay involved in the application of a trained machine learning module is usually considerably less than that involved in the training of the machine learning module. In particular, the time duration required for the selection of the current controller OR is substantially independent of the current manipulation state AMZ and is thus implementable under deterministic time stipulations. In contrast thereto, in the case of many planners known hitherto, it is generally not known beforehand when a planning result will be present.

The invention allows a reactive control of complex multilevel manipulation problems which may be subject to different and in particular time-dependent constraints. The controller system allows a robust implementation of the manipulation, that is to say that in many cases it is possible even to avoid obstacles in an optimized manner, without foundering thereon. Furthermore, a specification of the constraints to be complied with, of the manipulation target and also of the kinetics and dynamics of the components involved in the manipulation is often already sufficient in order to implement an efficient, globally optimized controller cascade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manipulation of an object by a robot, wherein the manipulation is directed at a manipulation target and comprises different manipulation modes, the method comprising:
   a) generating a plurality of manipulation mode-specific constraint-based controllers each for controlling a partial manipulation restricted to a manipulation mode;
   b) simulating, for a multiplicity of manipulation states and a multiplicity of the generated constraint-based controllers, in each case a partial manipulation which proceeds from the respective manipulation state and is controlled by the respective generated constraint-based controller, wherein an outlay value quantifying attainment of the manipulation target is determined;
   c) training, on a basis of the multiplicity of the manipulation states, the multiplicity of the generated constraint-based controllers and also the outlay values, a machine learning module to determine, on a basis of a current manipulation state, one of the generated constraint-based controllers which optimizes an outlay value;
   d) detecting the current manipulation state;
   e) determining an outlay-optimizing controller by the trained machine learning module on a basis of the current manipulation state, wherein the outlay-optimizing controller is configured to control a continuous and optimized path from the current manipulation state to the manipulation target; and
   f) generating control data for controlling the robot by the outlay-optimizing controller on the basis of the current manipulation state.

2. The method as claimed in claim 1, wherein a state space of the manipulation comprises a configuration of the robot, a robot state, an object state, a contact state between robot and object, a time parameter, a time derivative and/or a state of other components involved in the manipulation.

3. The method as claimed in claim 2, wherein different constraints to be complied with during the manipulation are detected, and in that a respective manipulation mode is derived from a restriction of the state space that is caused by a respective constraint.

4. The method as claimed in claim 3, wherein a respective constraint relates to a fixing of the object, a movement limitation of an axis of the robot, a collision avoidance, a speed limitation, an acceleration limitation, a force limitation and/or a distance limitation.

5. The method as claimed in claim 1, wherein a manipulation mode-specific constraint-based controller is generated for controlling a partial manipulation which is restricted to a first manipulation mode and leads to a second manipulation mode.

6. The method as claimed in claim 1, wherein a partial manipulation target is selected within a manipulation mode, and in that a manipulation mode-specific constraint-based controller is generated for controlling a partial manipulation which is restricted to the manipulation mode and leads to the partial manipulation target.

7. The method as claimed in claim 6, wherein the partial manipulation target is selected in a randomly based manner.

8. The method as claimed in claim 1, wherein the multiplicity of the manipulation states are generated in a randomly based manner, and/or in that the multiplicity of the generated constraint-based controllers are selected in a randomly based manner.

9. The method as claimed in claim 1, wherein the outlay value is determined depending on a simulated time duration and/or a number of simulated control steps until the manipulation target is attained.

10. The method as claimed in claim 1, wherein for a multiplicity of sequences of generated constraint-based controllers, in each case a manipulation controlled by the respective sequence is simulated, wherein an outlay value quantifying attainment of the manipulation target is determined, and in that the training of the machine learning module is effected on the basis of these determined outlay values.

11. The method as claimed in claim 1, wherein the machine learning module implements a method of reinforcement learning, a deep Q-network, an artificial neural network, a recurrent neural network, a convolutional neural network, an autoencoder, a deep learning architecture, a support vector machine, a data-driven regression model, a k-nearest neighbor classifier, a physical model and/or a decision tree.

12. A manipulation system comprising a robot for manipulation of an object, configured for carrying out a method as claimed in claim 1.

13. A computer program product, comprising a non-transitory computer readable hardware storage device having computer readable program code stored therein, said program code executable by a processor of a computer system to implement a method as claimed in claim 1.

14. A computer-readable storage medium comprising the computer program product as claimed in claim 13.

15. The method as claimed in claim 1, wherein the outlay-optimizing controller is determined in real time.

16. The method as claimed in claim 1, wherein the multiplicity of the generated constraint-based controllers includes both at least one random-target controller and at least one mode-switching controller, wherein the at least one random-target controller is configured to implement movements to steer toward a partial manipulation target selected in a randomly based manner within a manipulation mode, and wherein the at least one mode-switching controller is configured to change to a different manipulation mode.

17. The method as claimed in claim 1, wherein the multiplicity of the generated constraint-based controllers each control the partial manipulation which is restricted to the manipulation mode such that at least one constraint in a previous manipulation mode is no longer taken into account in a subsequent manipulation mode.

\* \* \* \* \*